United States Patent
Rutten et al.

(10) Patent No.: US 10,216,621 B1
(45) Date of Patent: Feb. 26, 2019

(54) AUTOMATED DIAGNOSTIC TESTING OF DATABASES AND CONFIGURATIONS FOR PERFORMANCE ANALYTICS VISUALIZATION SOFTWARE

(71) Applicant: ServiceNow, Inc., Santa Clara, CA (US)

(72) Inventors: Ong-Aat Rutten, Amsterdam (NL); Nabil Abu Asbi, Den Haag (NL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 15/815,458

(22) Filed: Nov. 16, 2017

(51) Int. Cl.
  *G06F 9/44* (2018.01)
  *G06F 11/36* (2006.01)
  *G06F 17/30* (2006.01)

(52) U.S. Cl.
  CPC .... *G06F 11/3676* (2013.01); *G06F 17/30477* (2013.01)

(58) Field of Classification Search
  CPC ............ G06F 11/3676; G06F 17/30477
  USPC ........................................... 717/131
  See application file for complete search history.

(56) References Cited

U.S. PATENT DOCUMENTS

| | | | | |
|---|---|---|---|---|
| 2014/0141768 A1* | 5/2014 | Javaid | ............... | G06F 11/3072 455/423 |
| 2015/0244580 A1* | 8/2015 | Saavedra | ............ | H04L 41/0816 709/221 |
| 2017/0154166 A1* | 6/2017 | Klein | ................... | G06F 19/363 |
| 2017/0181013 A1* | 6/2017 | Toka | ...................... | H04W 24/02 |
| 2018/0077080 A1* | 3/2018 | Gazier | ............... | H04L 12/4641 |
| 2018/0262597 A1* | 9/2018 | Matthieu | ................ | H04L 69/18 |

OTHER PUBLICATIONS

ServiceNow, ServiceNow Documentation—Jakarta ServiceNow Performance Analytics and Reporting, Oct. 23, 2017 (downloaded from public web site http://docs.servicenow.com).

* cited by examiner

*Primary Examiner* — Anna C Deng
(74) *Attorney, Agent, or Firm* — Fletcher Yoder, P.C.

(57) ABSTRACT

A system may include a performance analytics database defining key performance indicators (KPIs) associated with the managed network and defining dashboards that are configured to specify, on a performance analytics graphical user interface (GUI) within a managed network, graphical representations of the KPIs. The system may also include a diagnostic database containing representations of a plurality of tests configured to determine whether the KPIs and the dashboards comply with pre-defined rules. The system may also include a computing device operational to execute a diagnostic software program configured to: obtain a representation of a particular test that includes a plurality of rules; apply each of the rules to the KPIs and the dashboards stored in the performance analytics database; and write, when applying at least one of the rules indicates a problem, an associated severity, problem description, and solution description to the diagnostic database as output of the particular test.

20 Claims, 15 Drawing Sheets

FIG. 8C

AUTOMATED DIAGNOSTIC TESTING OF DATABASES AND CONFIGURATIONS FOR PERFORMANCE ANALYTICS VISUALIZATION SOFTWARE

BACKGROUND

Managed networks may include various types of computer networks that can be remotely administered. This management may involve one or more computing devices disposed with a remote network management platform collecting information about the configuration and operational states of software applications executing on behalf on the managed network, and then presenting representations of this information by way of one or more user interfaces. The user interfaces may be, for instance, web-based user interfaces.

Some of the collected information may relate to key performance indicators (KPIs). KPIs include any sort of measurement, reading, or data that is relevant to the managed network. Thus, KPIs may reflect performance of computing devices on the network itself (e.g., memory utilization, processor utilization, transactions per second) or performance of higher-level applications executing on the remote network management platform (e.g., a number of times per day that users on the managed network have requested a particular type of technical assistance). Among other capabilities, the user interfaces may be able to display KPIs in numerous visualizations, such as charts, graphs, or tables.

KPI data may be collected by scripts that are integrated into or separate from the user interface definitions. Collected KPI data may be stored in various database tables. Over time, however, entries in these tables can become corrupted, can be deleted, or the tables themselves may be modified or deleted. As a consequence, the scripts may fail to provide the proper data for certain visualizations. Furthermore, some scripts may be written in such as fashion that they use excessive resources, are otherwise inefficient, or do not operate properly in other ways.

SUMMARY

In order to overcome the deficiencies of current performance analytics software applications, at least one diagnostic program may be employed. Such a program may be configured to obtain diagnostic tests from a diagnostic database within the remote network management platform. The diagnostic tests may include one or more pre-defined rules. The rules may be checked to determine whether the KPIs and the visualizations defined thereof are consistent with one another, have an expected configuration, and any collection procedures for the KPIs have been performing properly.

After executing the diagnostic tests, the diagnostic program may write results to a diagnostic database within the remote network management platform. These results may be later retrieved and displayed upon a graphical user interface (GUI) of a client device accessing the remote network management platform (e.g., from the managed network). This allows users to rapidly identify and correct misconfigurations related to the performance analytics software applications.

Accordingly, a first example embodiment may involve a system for diagnostic testing of a performance analytics software application. The system may be disposed within a computational instance of a remote network management platform that remotely manages a managed network. The system may include a performance analytics database containing performance analytics data that define KPIs associated with the managed network and that define dashboards that are configured to specify, on a performance analytics GUI within the managed network, graphical representations of the KPIs. The system may also include a diagnostic database containing representations of a plurality of tests, the tests configured to determine whether the KPIs and the dashboards comply with pre-defined consistency, configuration, and performance rules. The system may also include a computing device operational to execute a diagnostic software program, where the diagnostic software program is configured to: obtain, from the diagnostic database, a representation of a particular test of the plurality of tests, where the particular test includes a plurality of the pre-defined consistency, configuration, and performance rules; apply each of the plurality of the pre-defined consistency, configuration, and performance rules to the KPIs and the dashboards stored in the performance analytics database; and write, when applying at least one of the plurality of the pre-defined consistency, configuration, and performance rules indicates a problem, an associated severity, problem description, and solution description to the diagnostic database as output of the particular test.

A second example embodiment may involve diagnostic testing of a performance analytics software application, where a performance analytics database, a diagnostic database, and a computing device are disposed within a computational instance of a remote network management platform that remotely manages a managed network. The second example embodiment may also involve obtaining, by the computing device and from the diagnostic database, a representation of a particular test from a plurality of tests stored therein, where the particular test is configured to determine compliance with a plurality of pre-defined consistency, configuration, and performance rules for (i) KPIs associated with the managed network and (ii) dashboards that are configured to specify, on a performance analytics GUI within the managed network, graphical representations of the KPIs, where representations of the KPIs and dashboards are stored in the performance analytics database. The second example embodiment may also involve applying, by the computing device, each of the plurality of the pre-defined consistency, configuration, and performance rules to the KPIs and the dashboards. The second example embodiment may also involve, when applying at least one of the plurality of the pre-defined consistency, configuration, and performance rules indicates a problem, writing, by the computing device, an associated severity, problem description, and solution description to the diagnostic database as output of the particular test.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8C depicts a performance analytics diagnostic graphical user interface, in accordance with example embodiments.

DETAILED DESCRIPTION

Figure 1:
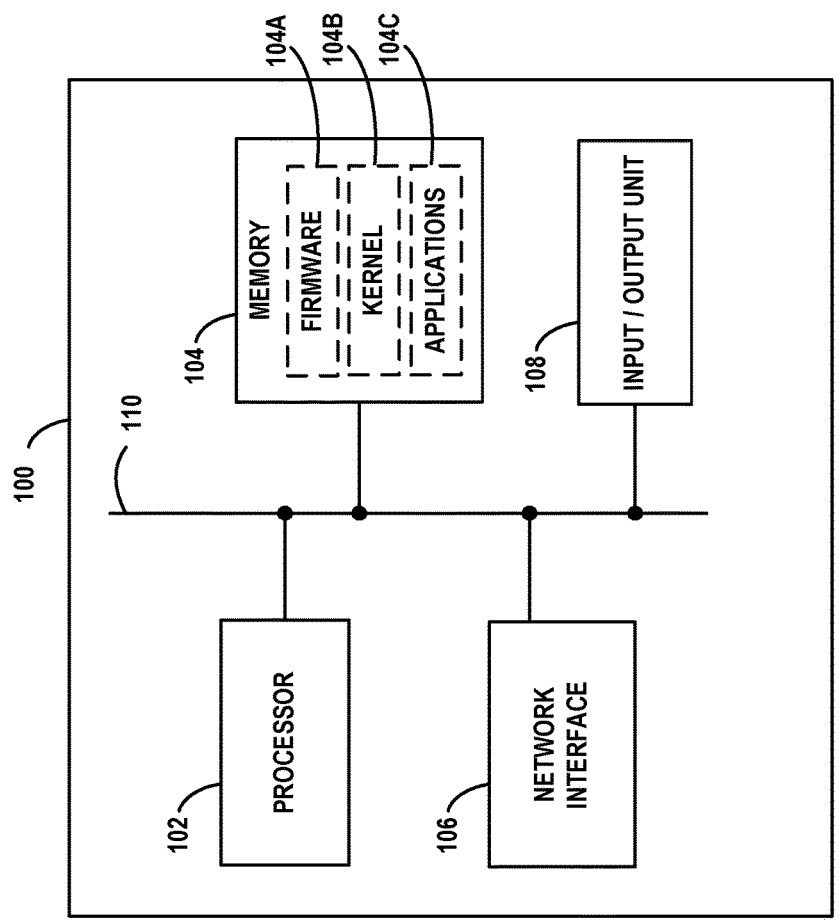
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
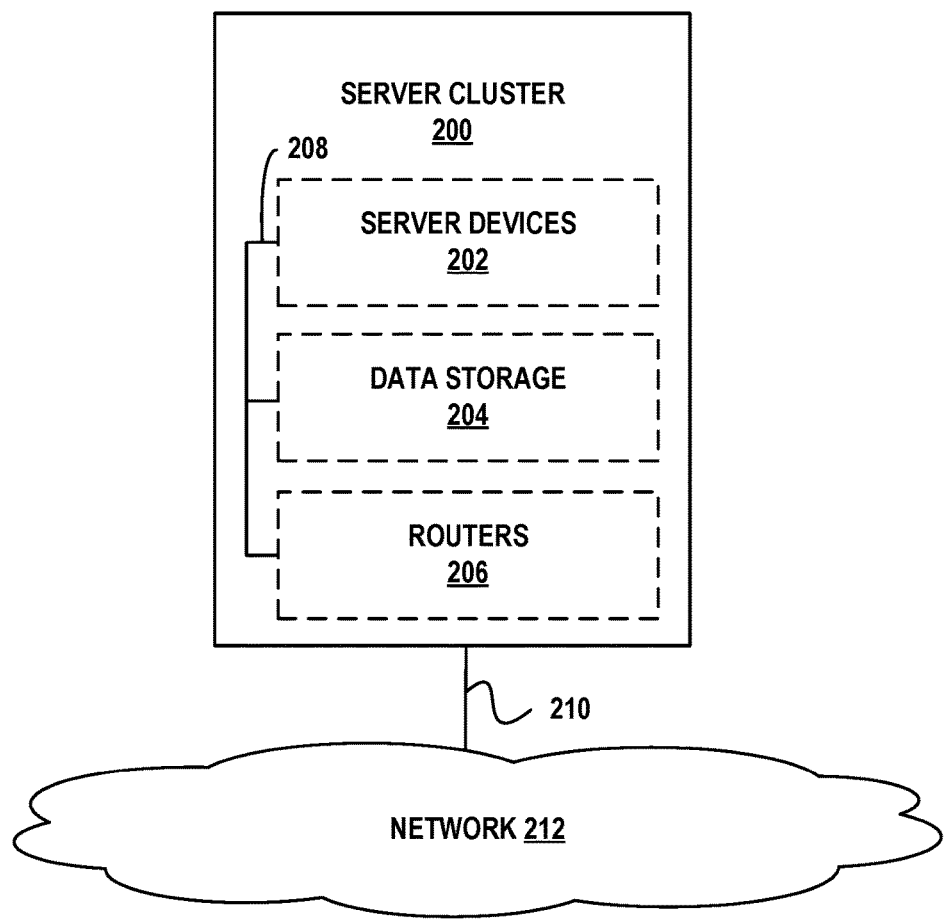
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
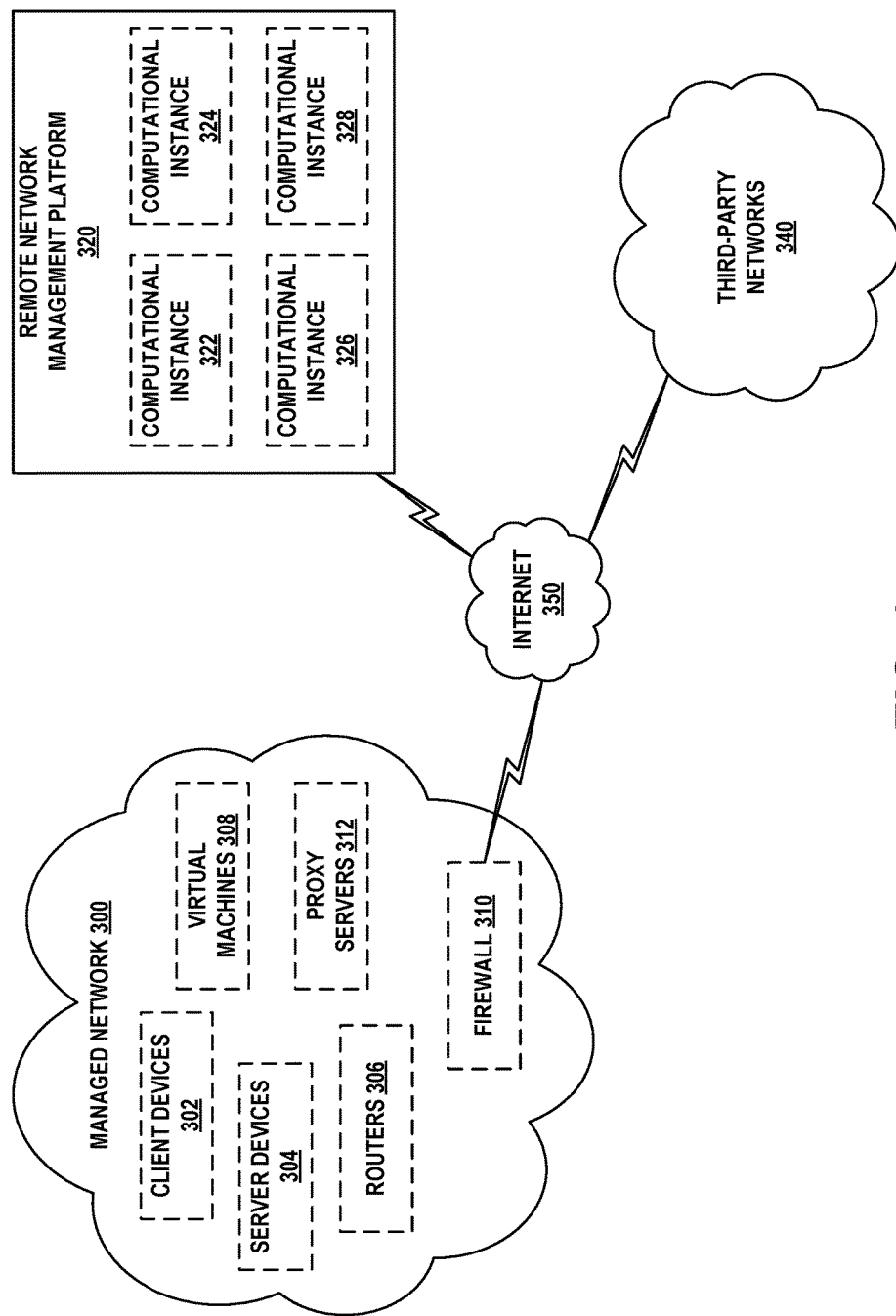
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
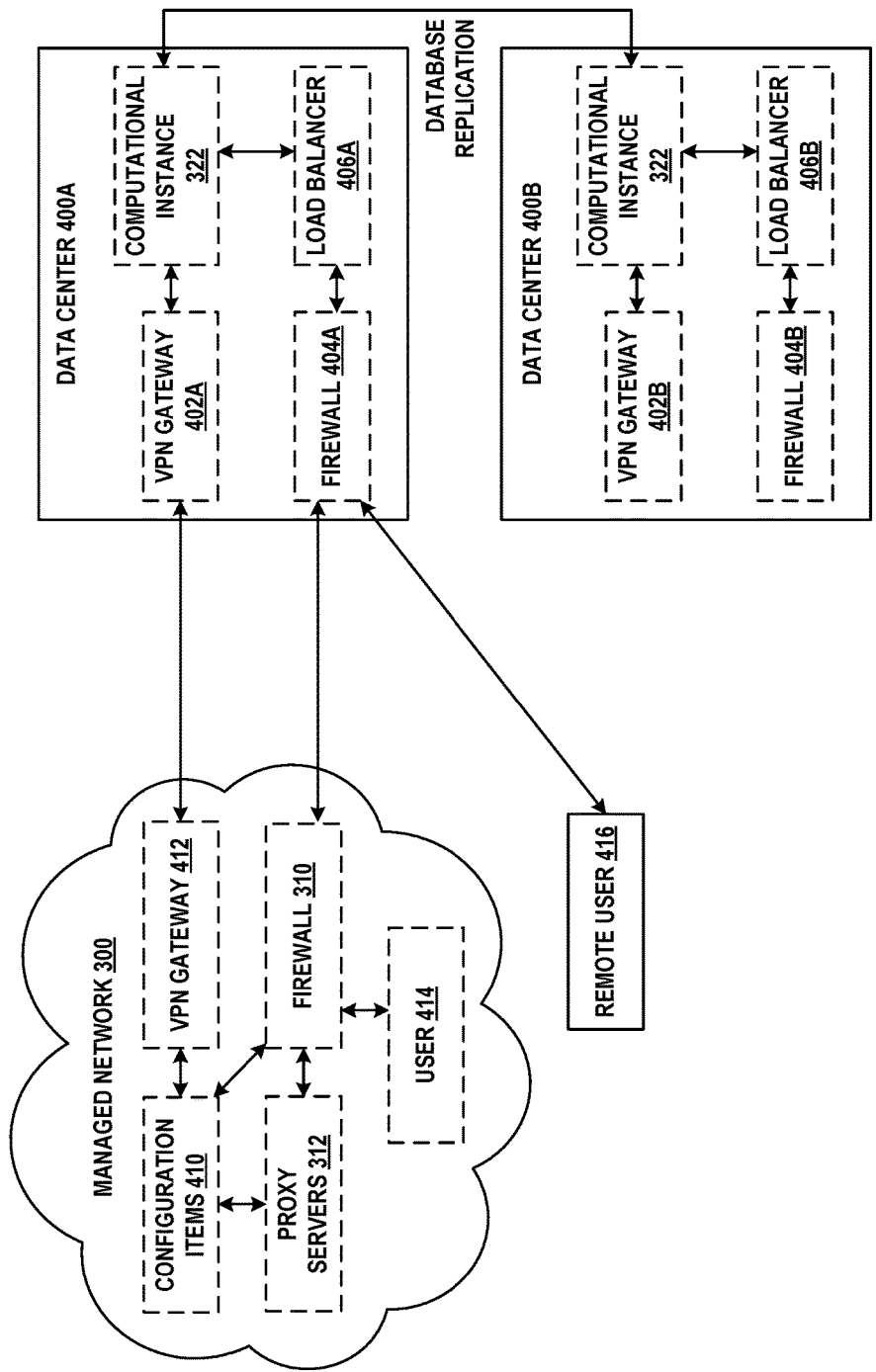
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
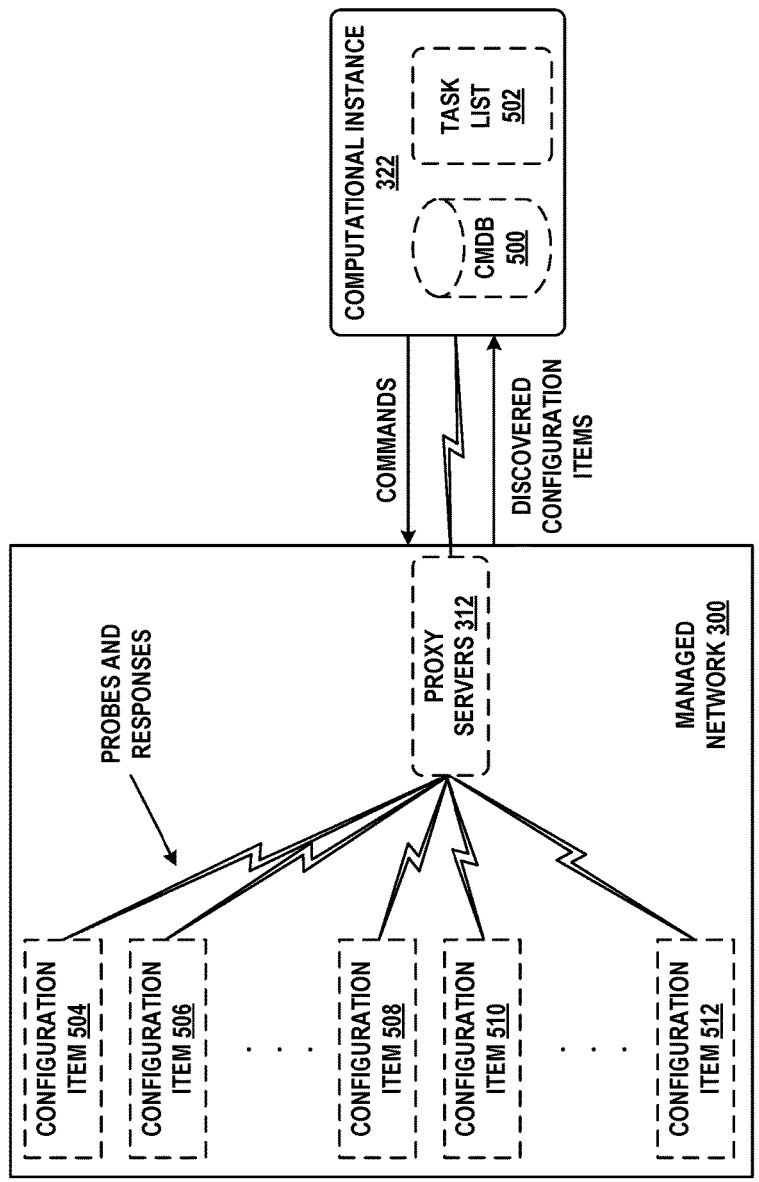
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
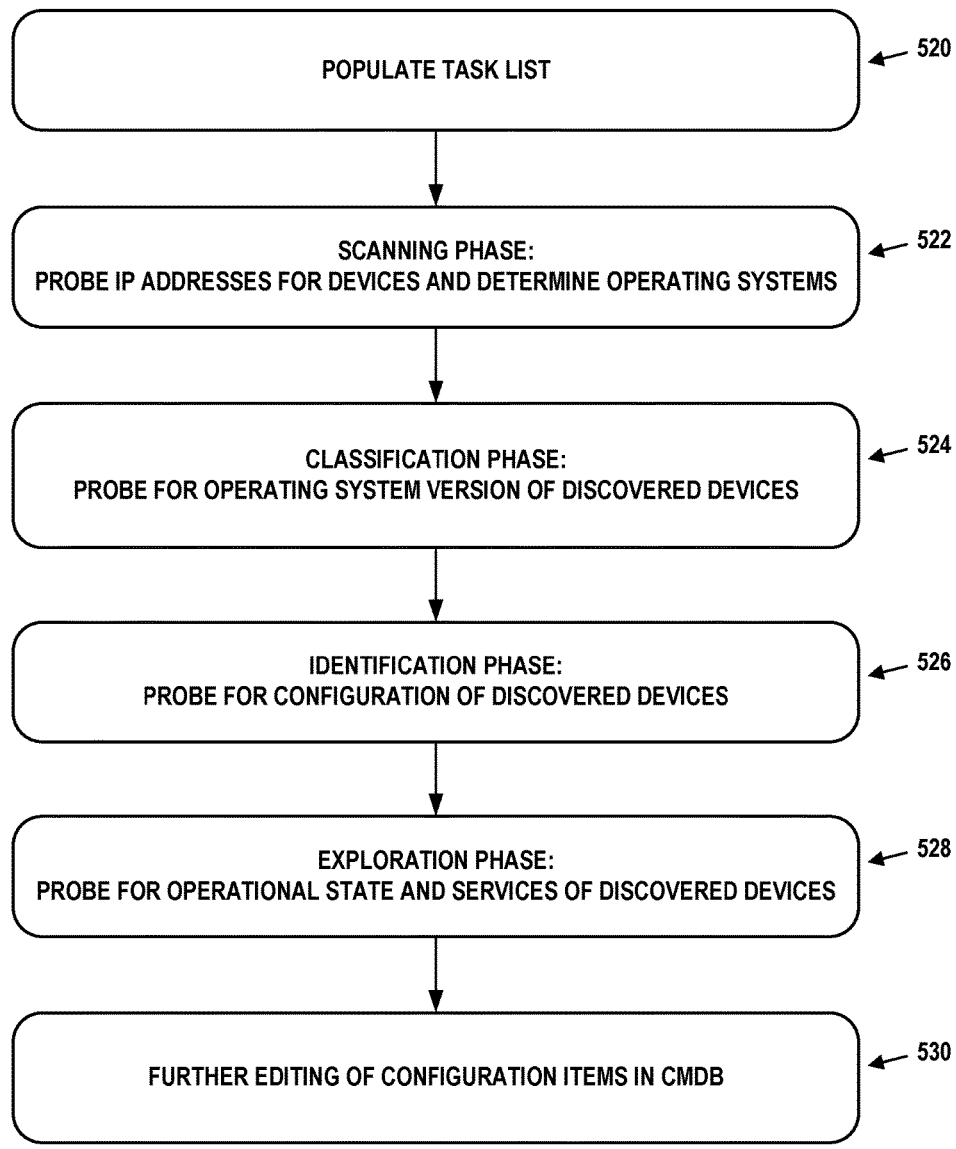
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. PERFORMANCE ANALYTICS VISUALIZATIONS

As described herein, a visualization may take various forms. Visualizations typically involve the presentation of KPIs in a graphical format.

KPIs may also be referred to as metrics or indicators. In general, KPIs are a type of performance measurement used to evaluate current and past conditions, as well as to forecast trends. KPIs can be used to evaluate the success of a particular activity, such as making progress toward strategic goals or the repeated achievement of some level of operational goal (for example, zero defects, a mean time to resolution of less than 24 hours for certain types of IT issues, or less than 70% processor utilization on a particular server device).

The act of measuring a KPI may be referred to as collection. KPIs are associated with one or more KPI sources that define one or more fields in a database table (sometimes called a facts table) that are to be collected in order to provide the KPI data. KPI sources may also specify filters to include only a subset of the information in a field.

A dashboard is single-screen GUI component that contains one or more tabs that logically group components that generally belong together. In some embodiments, a dashboard may be equivalent to or contained within a GUI window. Tabs may be graphical control elements that allow multiple documents or panels to be contained within a single dashboard. Tabs can be used to switch between such documents or panels. Individual GUI widgets may be present on such tabs. These widgets may display a KPI as a latest value, a time series, in a chart, in a speedometer, in a dial, in a scorecard, or in a column. Other variations are possible.

Breakdowns allow organization and filtering of KPI data on tabs and dashboards. In some embodiments, breakdowns may take the form of a drop down GUI widget. Regardless, the KPI data can be divided in various ways based on category. For instance, IT trouble ticket incidents can be divided by priority or by originating department. In some cases, breakdowns can use these multiple ways of dividing data in tandem, such as breaking down IT trouble ticket incidents first by priority, then by originating department.

A scorecard can be a dashboard, tab, or widget that displays data related to a single KPI (e.g., in a time series chart widget) and enables detailed analysis of this data. In some embodiments, each KPI may have an associated scorecard that is automatically created. The data may be viewed by breakdown and/or in aggregate (e.g., counts, sums, and maximums of the values). Scorecards may also provide ways of viewing the database fields on which the KPI values are based.

Any of these elements (dashboards, tabs, widgets, breakdowns, and scorecards) may be considered a visualization and can be user customized. For instance, a user can rearrange the tabs of a dashboard, add or remove widgets from a tab, and create new breakdowns.

Figure 6A:
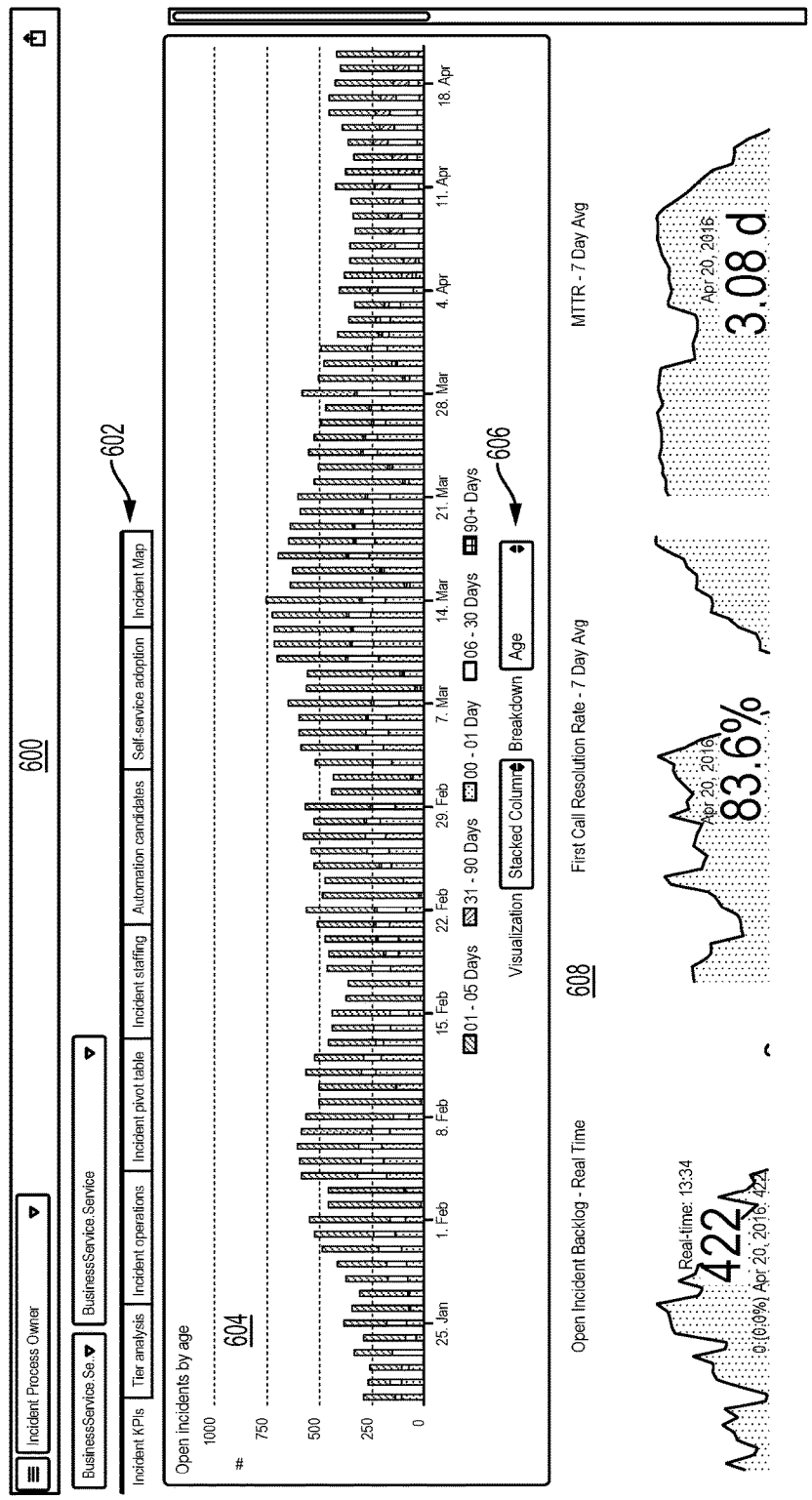
FIG. 6A depicts a performance analytics dashboard in the form of a graphical user interface, in accordance with example embodiments.
Figure 6B:
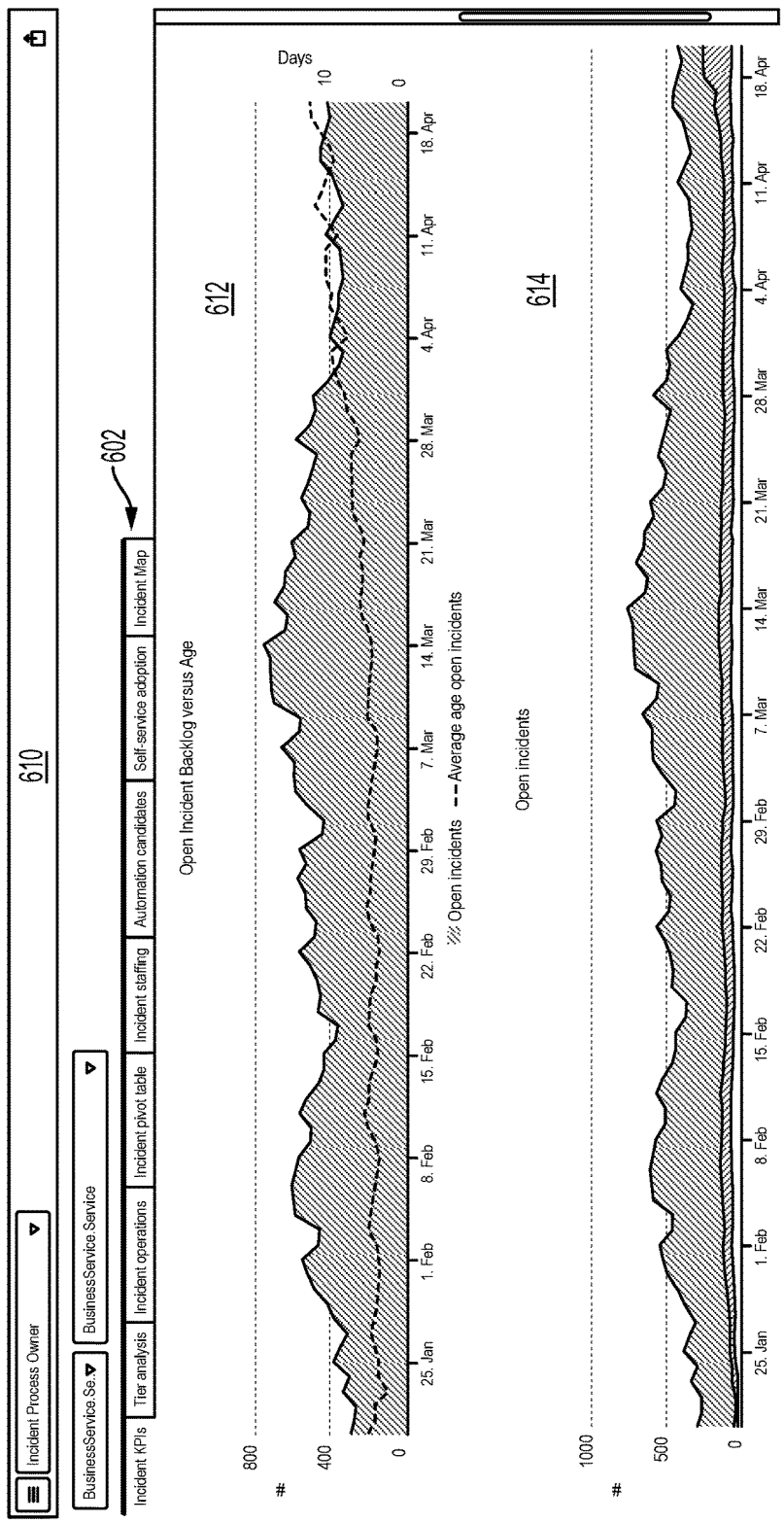
FIG. 6B depicts a performance analytics dashboard in the form of a graphical user interface, in accordance with example embodiments.

Example dashboards are shown in FIGS. 6A and 6B. Dashboard 600 of FIG. 6A includes multiple tabs 602, such as an "Incident KPIs" tab, a "Tier analysis" tab, and so on. The "Incident KPIs" tab is displayed, and includes a widget in the form of a bar chart 604, titled "Open incidents by age". Bar chart 604 plots, for each day of an approximately three-month time period, the total number of open incidents for the age ranges of 0-1 days, 1-5 days, 6-30 days, 31-90 days, and over 90 days. These age ranges may be defined by the "Age" category of breakdown 606.

These incidents may be, for example, trouble tickets or help requests opened with an IT organization. Each incident may therefore involve a particular problem that a user has experienced, such as a computer crashing, a user being unable to log on to a service, slow performance of a service, a request for new equipment, and so on. The IT organization may track its performance by measuring how long it takes to resolve the incidents. For example, bar chart 604 suggests that there were fewer open incidents near the end of the time frame than at the middle of the time frame, but that the incidents near the end of the time frame had remained open for a longer duration (i.e., there were more open incidents in the 31-90 days age range).

Dashboard 600 may also include section 608, which includes three widgets for: the extent of the open incident backlog (in this case, there are 422 open incidents currently), the first call resolution rate (in this case, 83.6%), and a seven-day running average of the mean time for an incident to be resolved (in this case, 3.08 days). This latter KPI may also be referred to mean time to resolution, or MTTR.

Dashboard 610 of FIG. 6B shows different example visualizations related to open incidents. This dashboard contains the same tabs 602, but includes charts 612 and 614 instead of bar chart 604 and section 608. Chart 612 plots, for the same time frame of the visualization in FIG. 6A, open incidents against the average age of these open incidents on a dual y-axis graph. Chart 614 also plots open incidents, but includes representations of the age distribution of these incidents.

Dashboards 600 and 610 also include various selectors, such as breakdowns in the form of drop down menus that allow the user to view these KPIs in different ways. Regardless of their exact mechanisms, these dashboards allow the user to rapidly determine the status of the organization's incident response KPIs through the use of visualizations that combine these KPIs.

The data displayed in bar chart 604, section 608, chart 610, and chart 612 may be visualizations defined by a data model. Thus, information defining these visualizations may be stored in a database according to that data model. The information may also be identified as representing one or more KPIs, and each KPI may be represented as one or more tables in the data model. As demonstrated in FIGS. 6A and 6B, multiple visualizations may use the same KPIs to provide different views of the represented data.

As such, if any of the database tables, or entries within these tables, that are relied on by the visualization software are missing, the visualization may fail. For instance, the user may see a blank visualization, a partial visualization, or an error message. Furthermore, since the elements of visualizations can be defined and/or modified by users, it is possible for the users to misconfigure the visualization. As examples, the user may define a KPI without defining how values of the KPI are to be collected, define a KPI without using the KPI in any visualization, or associate the KPI with invalid conditions. Moreover, inefficiently designed visualization tasks, such as reading a whole table to access just a few entries or trying to combine too many KPIs in a single visualization, can leads to performance degradation in not only performance analytics tasks, but also for the computational instance in general.

VI. PERFORMANCE ANALYTICS DIAGNOSTIC TESTING

In order to detect the types of problems described above, a computational instance of a remote network management platform may periodically or from time to time carry out automated diagnostic testing of its performance analytics subsystem. These diagnostic tests may be configured to be performed at a particular point in time each day or each week, may be performed in response to a user request, or may be triggered by a different event.

The diagnostic testing may involve a script (or another software program) on the computational instance obtaining a set of rules for each diagnostic test. Each of the rules may specify a potential performance analytics problem. The script may query a number of database tables, fields within these tables, and/or configuration information stored within one or more files on the computational instance. For each rule, the script may check one or more conditions, values, or parameters. Based on the outcome of the check(s), the script may log or inform the user of one or more detected problems found by the diagnostic test. In some cases, the script can generate a GUI (e.g., a web page) displaying the outcome of the diagnostic test.

As an example, a particular dashboard may require: the existence of a particular database table, the existence of a particular field within the database table, and that the particular field contain a value within a particular range. This information may be encoded as three distinct rules of a diagnostic test. When the script executes, these rules may cause the script to check for the existence of the particular database table, the existence of the particular field within the database table, and the field to contain a value within the particular range. If all of these checks pass, the script may record an indication that the requirements of the diagnostic test are satisfied. However, if one or more of these checks fail, the script may record an indication that the requirements of the diagnostic test have not been satisfied, specify which rules have failed checks, provide a detailed description of each failed check, and/or suggest an action that can be taken in order to rectify the underlying problem. Furthermore, the indication may include a reference to the specific database table and records therein that are problematic so that the problem can be more easily remediated.

A. Example Diagnostic Architecture

Figure 7:
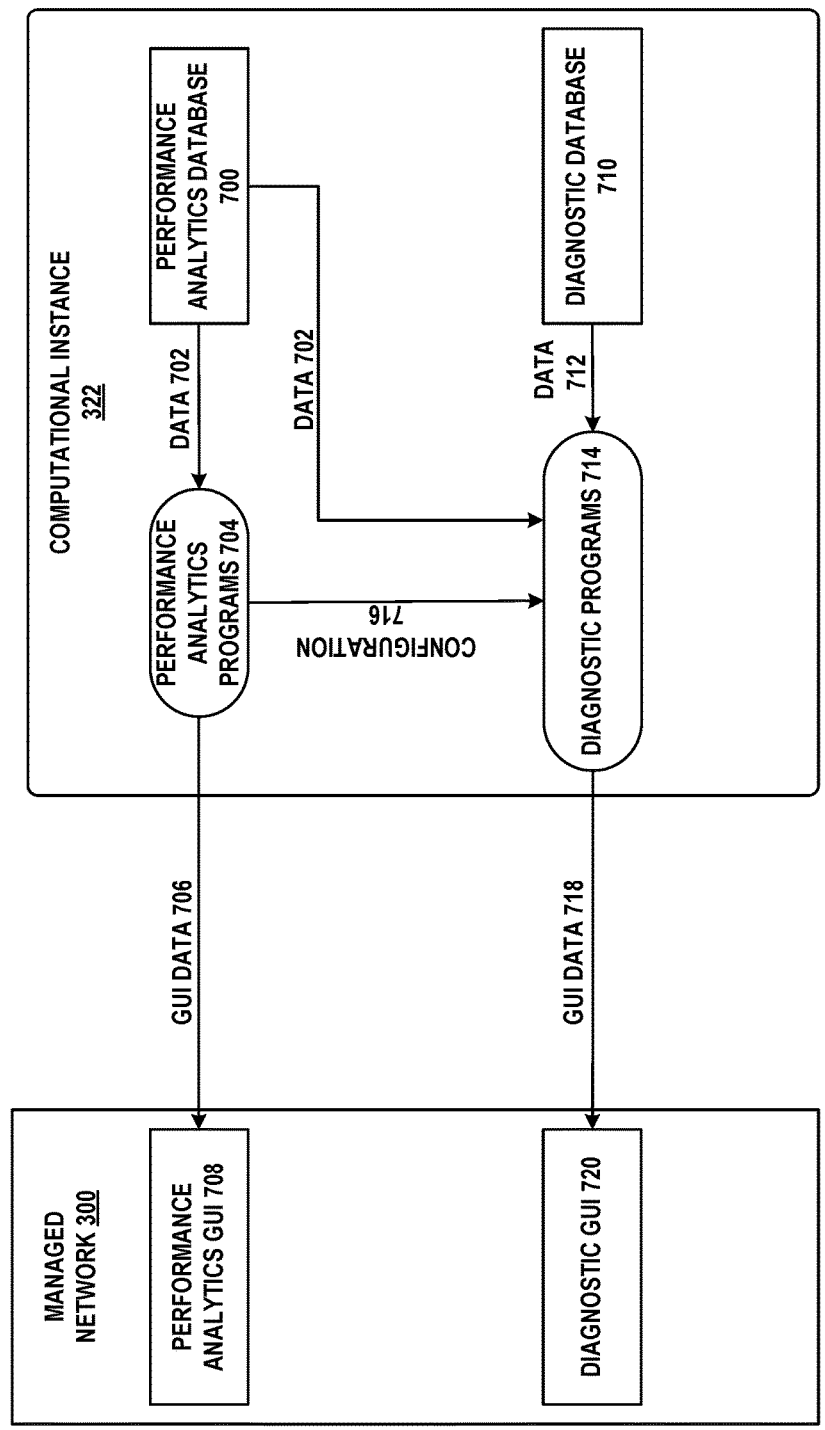
FIG. 7 depicts a performance analytics diagnostic architecture, in accordance with example embodiments.

FIG. 7 depicts an example architecture for performance analytics diagnostic testing. As discussed previously, managed network 300 is remotely managed by computational instance 322 of a remote network management platform.

Computational instance 322 includes performance analytics database 700, storing performance analytics data 702. Performance analytics data 702 may be information collected and/or related to various KPIs, such as values of these KPIs over time. Performance analytics data 702 may also include dashboard definitions, for example. Performance analytics data 702, or data derived therefrom, may be displayed on performance analytics dashboards, such as those shown in FIGS. 6A and 6B.

Performance analytics programs 704 may include one or more software programs that receive and process performance analytics data 702. These programs may be standalone executable programs or scripts embedded into web pages, for example. In some cases, performance analytics programs 704 may obtain and/or generate GUI data 706 (e.g., markup files, text, and/or graphics) based at least in part on performance analytics data 702. Performance analytics programs 704 may transmit GUI data 706 to performance analytics GUI 708 on managed network 300. Performance analytics programs 704 may also store a representation of its settings as configuration 716, and provide a copy of configuration 716 to other program upon request.

Performance analytics GUI 708 may represent computer hardware and software configured to display GUI data 706 in the form of a GUI. Examples of such a GUI are shown in FIGS. 6A and 6B. The displayed GUI may be interactive, and thus allow a user to modify the information displayed. In some cases, this will result in performance analytics GUI 708 requesting more of performance analytics data 702 by way of performance analytics programs 704.

Computational instance 322 may also include diagnostic database 706, storing diagnostic data 712. Diagnostic data 712 may define rules and tests that can be used to detect and/or diagnose problems with performance analytics database 700 and/or performance analytics programs 704.

Diagnostic programs 714 may include one or more software programs that process diagnostic data 712. These programs may be standalone executable programs or scripts embedded into web pages, for example. In some cases, diagnostic programs 714 may generate GUI data 718 (e.g., markup files, text, and/or graphics) based at least in part on performance analytics data 702, diagnostic data 712, and configuration 716. Configuration 716 may define how certain operations of performance analytics programs 704 are to be carried out. Diagnostic programs 714 may transmit GUI data 718 to diagnostic GUI 720 on managed network 300.

Diagnostics GUI 708 may represent computer hardware and software configured to display GUI data 718 in the form of a GUI. Examples of such GUIs are shown in FIGS. 8A, 8B, 8C, 8D, and 8E. The displayed GUI may be interactive, and thus allow a user to modify the information displayed. In some cases, this will result in diagnostic GUI 720 requesting more of performance analytics data 702, diagnostic data 712, and/or configuration 716 by way of performance analytics programs 704.

As an example, diagnostic database 710 may include a diagnostic test. This diagnostic test may define a rule that specifies that dashboards defined in performance analytics database 700, that use database tables, require the respective database tables to exist in performance analytics database 700. Diagnostic programs 714 may retrieve the diagnostic test from diagnostic database 710 in the form of diagnostic data 712. Diagnostic programs 714 may parse this data to obtain the definition of the diagnostic test.

Then, diagnostic programs 714 may retrieve definitions of the dashboards defined in performance analytics database 700, in the form of performance analytics data 702. For each dashboard, diagnostic programs 714 may check for the existence of any database tables referenced therein by querying performance analytics database for these database tables. If all of the database tables referenced by the dashboard are present in performance analytics database 700, diagnostic programs 714 may indicate that the diagnostic test passed. For any database tables referenced by the dashboard that are not present in performance analytics database 700, diagnostic programs 714 may indicate as such.

B. Example Diagnostic Test Types

Table 1, below, depicts representations of a number of diagnostic tests that can be performed by a diagnostic program. The diagnostic tests shown are not comprehensive, and new diagnostic tests may be defined. Each diagnostic test in Table 1 is shown with a category, severity, description, and solution.

The category provides a general type of the diagnostic test. For example, the categories in Table 1 include "bad table or field", "invalid user", "bad configuration", and "performance problem". Other categories may exist, and it is possible for one diagnostic test to be placed in multiple categories.

The severity indicates a degree of seriousness associated with a failed diagnostic test. The severities shown in Table 1 include an "error" severity, indicating that an associated KPI or dashboard will likely fail to display properly until the error is addressed. Table 1 also includes a "warning" severity, indicating that an associated KPI or dashboard will likely display at least some data properly, but the KPI or dashboard are misconfigured in some fashion that may cause some data to be improperly displayed or not displayed at all. Table 1 also includes an "information" severity, indicating that the KPI or dashboard is misconfigured in a fashion that is unlikely to prevent the proper display of data. But this misconfiguration should still be corrected for purposes of correctness or efficiency.

The description provides a short textual explanation of each diagnostic test. This may include an explanation of a problem detected by the diagnostic test. This information can be displayed to the user, for example, by way of a GUI.

The solution provides a short textual explanation of what the user can do in order to address the problem detected by the diagnostic test. In some cases, this explanation may be best practice guidance, and might or might not actually solve the problem. Regardless, this information can also be displayed to the user, for example, by way of a GUI.

As an illustrative example, the first diagnostic test in Table 1 is of the "bad field or table" category with an "error" severity. The description indicates that the script that creates the performance analytics dashboard (e.g., one of performance analytics programs 704) references or otherwise uses one or more fields in a database table (e.g., within performance analytics database 700) that do not exist. This will likely cause the script to fail and/or the dashboard to be not displayable. The solution suggests that the user check the validity of each script reference to a field in the database table, and update any incorrect references. In some cases, this may involve changing or removing the reference in the script, or adding the referenced field to the database table.

TABLE 1

| Category | Severity | Description | Solution |
| --- | --- | --- | --- |
| Bad table or field | Error | This script uses one or more fields that do not exist, | Update the script to ensure that all field references are valid. |
| Invalid user | Error | The Run as user defined for this collection job is not valid or active. | Update the collection job Run as field to a different user, or ensure that the current user record is active and the User ID field is populated. |
| Bad table or field | Error | There are one or more invalid fields in this KPI's condition. | Update the KPI to ensure that all conditions reference valid fields. |
| Bad table or field | Error | An interactive filter based on Date has no tables or fields mapped to it. | In the Interactive Filter record, scroll down to the Interactive Filter Dates related list and click New to add a new target table mapping. |
| Bad table or field | Error | An interactive filter based on Reference has no tables or fields mapped to it. | In the Interactive Filter record, scroll down to the Interactive Filter References related list and click New to add a new Interactive Filter References record. |
| Bad table or field | Error | This script references a table that does not exist. | Update the script to reference a valid table. |
| Bad table or field | Error | This breakdown element filter contains fields that do not exist, | Update the breakdown element filter to ensure that all conditions are valid. |
| Bad configuration | Error | An interactive filter based on Group has no child filters mapped to it. | In the Interactive Filter record, scroll down to the Interactive Filter Groups related list and click Insert a new row to add new Interactive Filter groups. |
| Bad table or field | Error | This KPI source is using a table that does not exist. | Update the KPI source to use a valid facts table. |
| Bad table or field | Error | A condition used in this Breakdown Source is not valid. There are one or more invalid fields in the Conditions. | Update the Breakdown Source to ensure that the Facts table and Conditions are valid. |
| Bad table or field | Error | This KPI source contains Conditions that references one or more invalid fields from the selected Facts table. | Update the KPI source to ensure that the Facts table and Conditions are valid, |
| Bad table or field | Error | This breakdown source uses a Facts table or Field that does not exist. | Update the breakdown source to use a valid Facts table and Field. |
| Bad configuration | Error | This KPI uses unsupported condition operators. | Update the KPI to use only supported condition operators. |
| Bad configuration | Error | An interactive filter based on Cascading Filter has no cascading filters mapped to it. | In the Interactive Filter record, scroll down to the Cascading Filter related list and click New to add a new Cascading Filter record. |
| Performance problem | Information | A collection job log is still in the Collecting state but collection is no longer running. | Check if the job has been restarted. If not, restart it manually. |
| Bad configuration | Information | There are no KPIs defined for a KPI source. | Create a KPI that uses the KPI source or remove the KPI source. |
| Bad configuration | Information | A breakdown source is inactive. | Verify that the breakdown source was not automatically deactivated by a collection job where it is being used. This occurs when the breakdown source returns more rows than allowed. Additionally, make changes to the breakdown source if required and then (re)activate this breakdown source. |
| Bad configuration | Information | An automated KPI is associated with an active collection job but is not used in any widgets or formula KPI. | Use the automated KPI in a widget or formula KPI. If the automated KPI is not used, remove the KPI from the associated collection jobs and delete the KPI. |

TABLE 1-continued

| Category | Severity | Description | Solution |
| --- | --- | --- | --- |
| Bad configuration | Information | A breakdown source is not used by any breakdowns. | Create a breakdown that uses the breakdown source or remove the breakdown source. |
| Bad configuration | Warning | An inactive breakdown source is associated with active KPIs or collection jobs. | Verify that the breakdown source was not automatically deactivated by a collection job where it is being used. This occurs when the breakdown source returns more rows than allowed. Additionally, make changes to the breakdown source if required and then (re)activate this breakdown source. |
| Bad configuration | Warning | An automated KPI used by a widget is not associated with any collection jobs. | Associate the automated KPI with a collection job and set the Active field on the job KPI record to true. |
| Bad configuration | Warning | A breakdown has no breakdown mappings. | Define a breakdown mapping for the breakdown. |
| Bad configuration | Warning | An automated KPI is not associated with a collection job. | Associate the automated KPI with a collection job and set the Active field on the job KPI record to true. |
| Bad configuration | Warning | A script references fields on the 'current' record that are not listed in the fields list. | Add the missing fields to the fields list. |
| Performance problem | Warning | A data collection job ended with a collection warning. | Check the job logs for warnings to identify the issue. |
| Bad configuration | Warning | A collection job does not have any KPIs associated with it. | Add an automated KPI to the data collection job. |
| Bad configuration | Warning | Multiple automated KPI have the same KPI source, Conditions, Aggregate, and Field or Script values. | Update references, such as in widgets and formula KPI, to use only one of the duplicate automated KPI, and then delete the unused duplicate KPI. |
| Bad configuration | Warning | A KPI is associated with multiple active scheduled data collection jobs. | Associate the KPI with only one scheduled data collection job. You should only associate the KPI with multiple on-demand jobs that do not run on a schedule. |
| Performance | Warning | A data collection job ended with a problem collection error. | Check the job logs for errors to identify the issue. |
| Bad configuration | Warning | A breakdown has multiple breakdown mappings using the same facts table. | Remove one of the breakdown mappings containing the duplicate facts table. |
| Bad configuration | Warning | A widget references a non-existent KPI. | Update the widget to reference a valid KPI. |
| Bad configuration | Warning | A formula KPI contains one or more invalid KPIs, breakdowns, or breakdown elements, or the formula KPI references itself. | Update the formula to ensure that all KPIs, breakdowns, and breakdown elements are valid and that the formula KPI does not reference itself. |
| Performance problem | Warning | A scheduled collection job has an average execution time that is too long. | Check the job logs to identify possible sources of slowness. The following values may help identify the root cause. The score collection relative start and end interval The number of different KPI sources used by the KPIs If the job includes inefficient scripted KPIs or breakdowns If there are slow queries during the job execution. |
| Bad configuration | Warning | A widget references a non-existent breakdown in the Breakdown or 2nd Breakdown field. | Update the widget to reference a valid breakdown. |
| Bad configuration | Warning | A formula or manual KPI is associated with a collection job. | Remove all formula and manual KPIs from collection jobs. Associate only automated KPIs with collection jobs. |

C. Example Graphical User Interfaces

FIGS. 8A-8E depict example GUIs that may be displayed in conjunction with a diagnostics program (e.g., one of diagnostics programs 714) for a performance analytics software application (e.g., one of performance analytics programs 704). For instance, these GUIs may be displayed, on a client device disposed within a managed network, when the client device invokes the diagnostic program to be executed on a computational instance of a remote network management program.

Figure 8A:
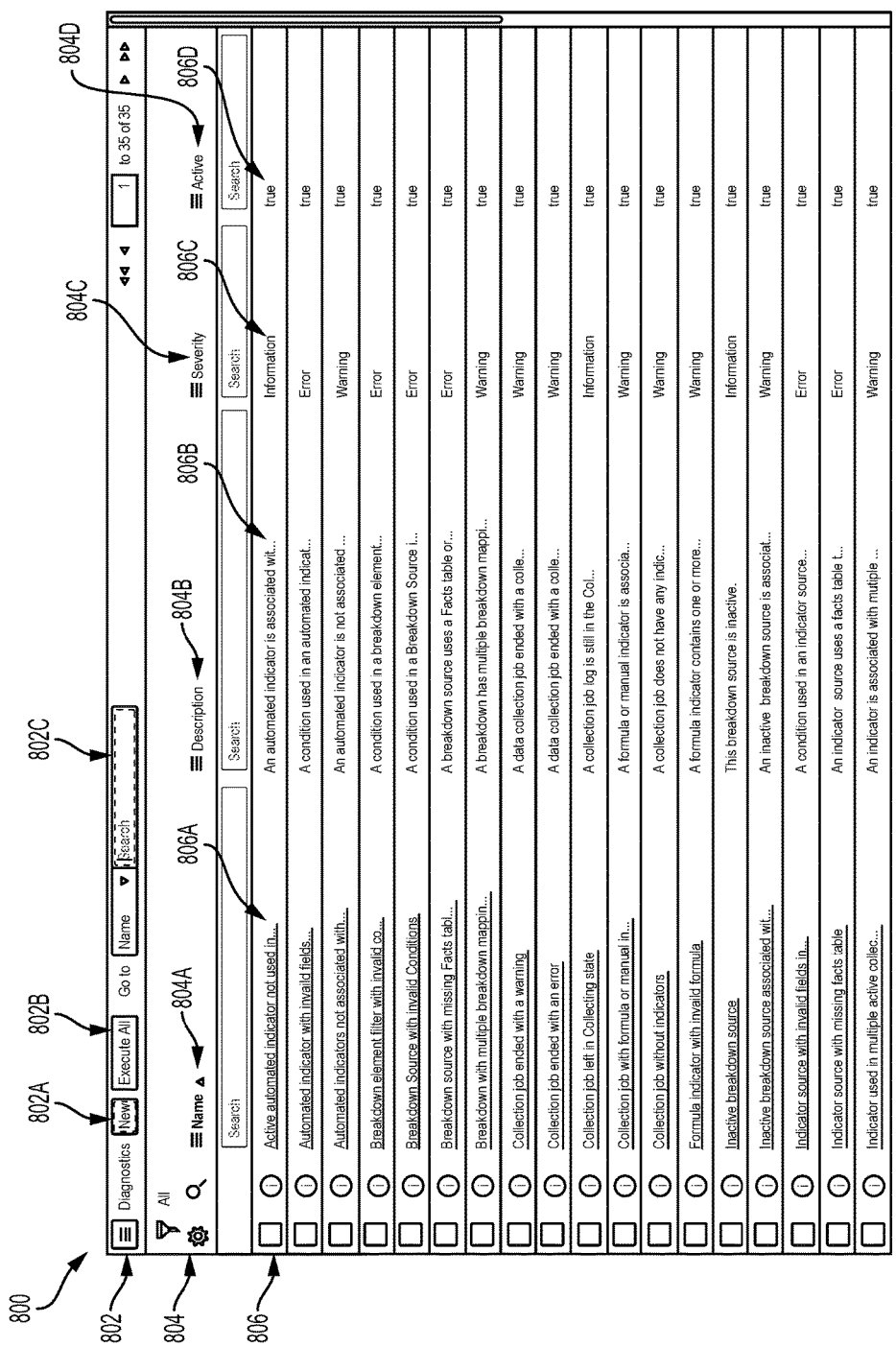
FIG. 8A depicts performance analytics diagnostic output in the form of a graphical user interface, in accordance with example embodiments.

FIG. 8A depicts GUI 800 including a tabular menu through which one or more diagnostic tests can be selected. GUI 800 includes menu bar 802, header row 804, and example diagnostic test 806.

Menu bar 802 includes "New" button 802A, "Execute All" button 802B, and search box 802C. Activation of "New" button 802A may cause a new GUI or window to appear in which a new diagnostic test can be defined. This functionality allows users to define their own diagnostic tests. Activation of "Execute All" button 802B may cause all diagnostic tests to be performed, including those listed on GUI 800 as well as any others not shown therein. In some embodiments, one or more selected diagnostic tests can be executed by way of another control on GUI 800. Entry of data (e.g., a text string) into search box 802C may cause the list of diagnostic tests on GUI 800 to be filtered so that only those with fields containing the entered data are displayed on GUI 800.

Header bar 804 provides column titles for the diagnostic tests displayed in GUI 800, including a name header 804A, description header 804B, severity header 804C, and active header 804D.

Name header 804A is disposed above a column containing the names of the diagnostic tests. Note that these names are omitted from Table 1 for sake of brevity.

Description header 804B is disposed above a column containing descriptions of the diagnostic tests. In some embodiments, these descriptions may correspond to the descriptions of diagnostic tests in the description column of Table 1.

Severity header 804C is disposed above a column containing the severity of the problems checked for by the diagnostic tests. These severities may correspond to the "Severity" column of Table 1.

Active header 804D is disposed above a column containing an indication of whether each diagnostic test is active. In some embodiments, the values in this column may either be "true" to indicate that the diagnostic test is active or "false" to indicate that the diagnostic test is inactive. An active diagnostic test can be performed by the diagnostic program, and an inactive diagnostic test might not be able to be performed by diagnostic program.

The diagnostic tests may be sortable by each of these column headers. For instance, in GUI 800, the diagnostic tests are sorted alphabetically by name.

Example diagnostic test 806 is one of possibly many such diagnostic tests, each individually selectable for execution by the diagnostic program. As shown in FIG. 8A, example diagnostic test 806 includes name indicator 806A, description indicator 806B, severity indicator 806C, and active indicator 806D.

Figure 8B:
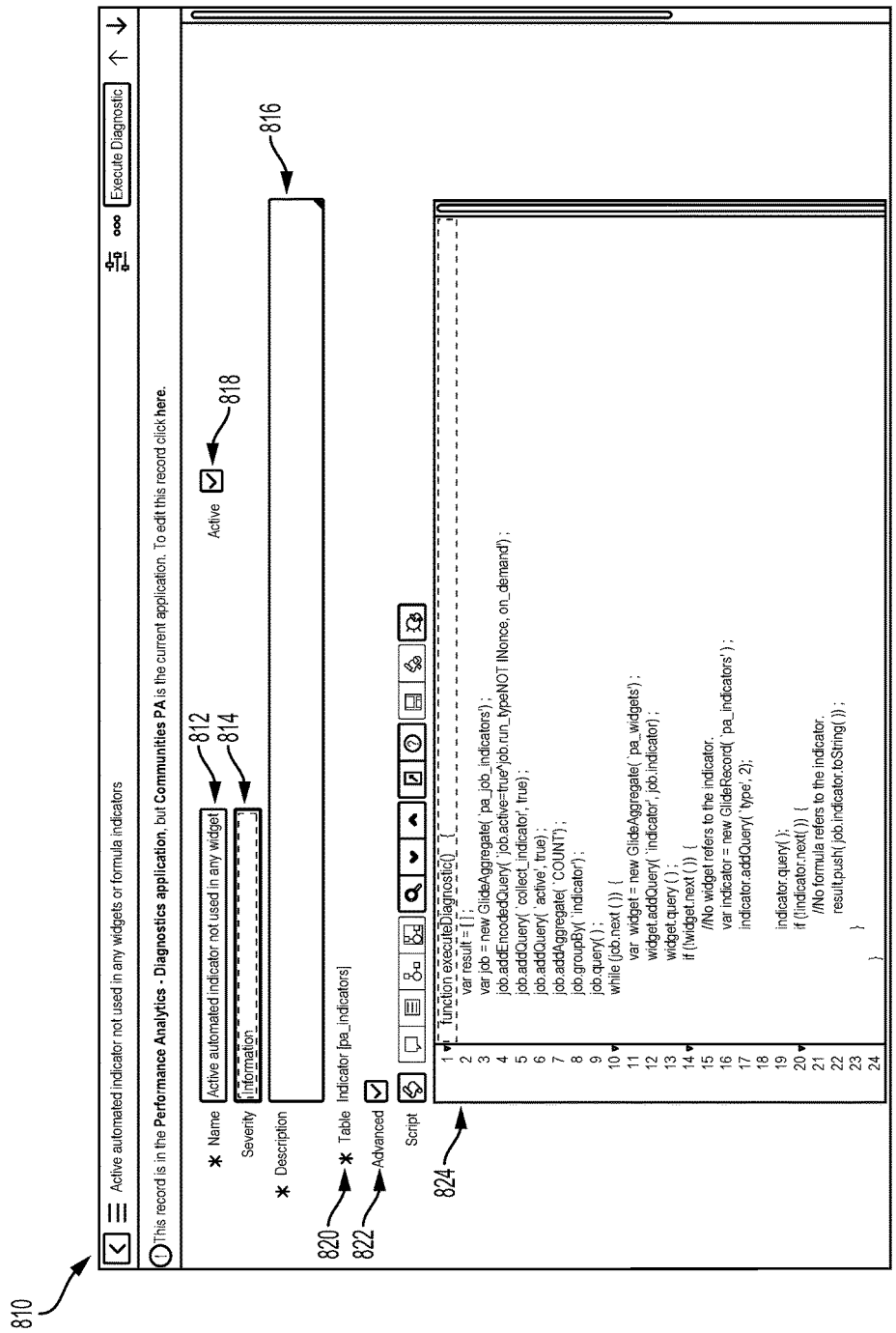
FIG. 8B depicts a performance analytics diagnostic graphical user interface, in accordance with example embodiments.

FIG. 8B depicts GUI 810 through which a diagnostic test can be viewed and edited. In particular, GUI 810 includes details relating to example diagnostic test 806. Navigation from GUI 800 to GUI 810 may occur when a user clicks on or otherwise activates any of name indicator 806A, description indicator 806B, severity indicator 806C, or active indicator 806D.

GUI 810 may include name text box 812, severity text box 814, description text box 816 and active checkbox 818. These GUI components may be user-editable and correspond to name indicator 806A, description indicator 806B, severity indicator 806C, and active indicator 806D, respectively.

Table indicator 820 may provide the name of the database table that is used by script 824. Thus, table indicator 820 may refer to a database table in performance analytics database 700.

Advanced checkbox 822 allows the user to control the type of GUI that is used to view and/or edit a diagnostic test. In FIG. 8B, this checkbox is checked, indicating that GUI 810 depicts an advanced editing mode. Unchecking this box may result in navigation from GUI 810 to GUI 830 in FIG. 8C.

Code editor 824 of FIG. 8B may be a large text box that allows a user to view and/or edit script code. In this fashion, the user may customize the script to perform diagnostic tests in accordance with technical requirements or best practices, for example.

Figure 8C:
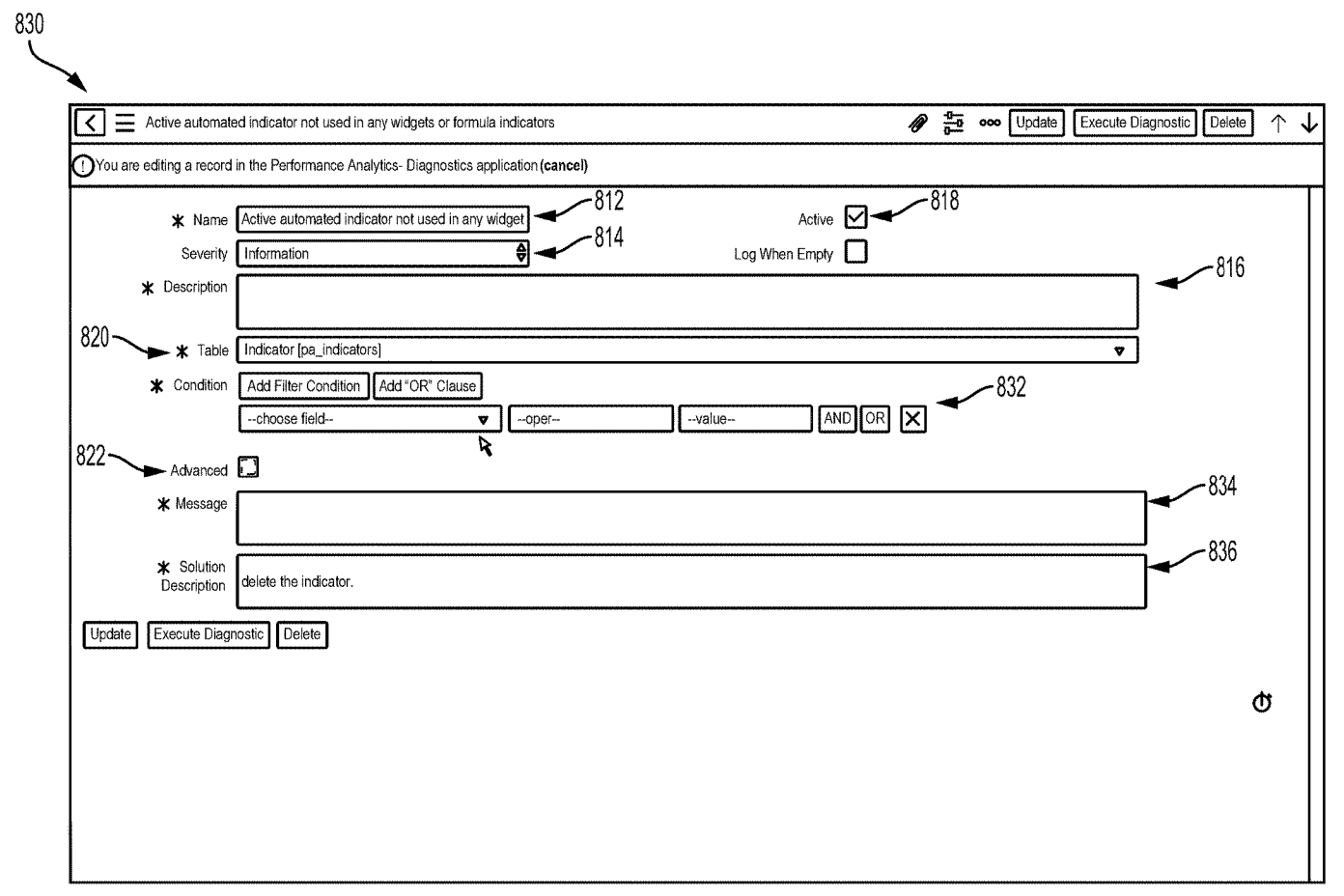

FIG. 8C depicts GUI 830 through which a diagnostic test can be viewed and edited. In particular, GUI 830 includes details relating to example diagnostic test 806. As noted above, navigation from GUI 810 to GUI 830 may occur when a user unchecks advanced checkbox 822. Similarly, navigation from GUI 830 to GUI 810 may occur when a user checks advanced checkbox 822.

Similar to GUI 810, GUI 830 depicts name text box 812, severity text box 814, description text box 816 and active checkbox 818. As noted, these GUI components may be user-editable and correspond to name indicator 806A, description indicator 806B, severity indicator 806C, and active indicator 806D, respectively. GUI 830 also depicts table indicator 820.

GUI 830 differs from GUI 810 at least in its depiction of condition configurator 832, message text box 834, and solution description text box 836 (note that GUI 810 may also contain message text box 834 and solution description text box 836 positioned below code editor 824, for instance). Condition configurator 832 may include text boxes, drop down menus, and/or other GUI components that allow a user to specify one or more rules of a diagnostic test. Message text box 834 is user-editable and contains text to be stored or displayed when this diagnostic test detects a problem. This text describes the problem. Solution description text box 836 contains text to be stored or displayed when this diagnostic test detects a problem. This text provides a possible solution for the problem.

Figure 8D:
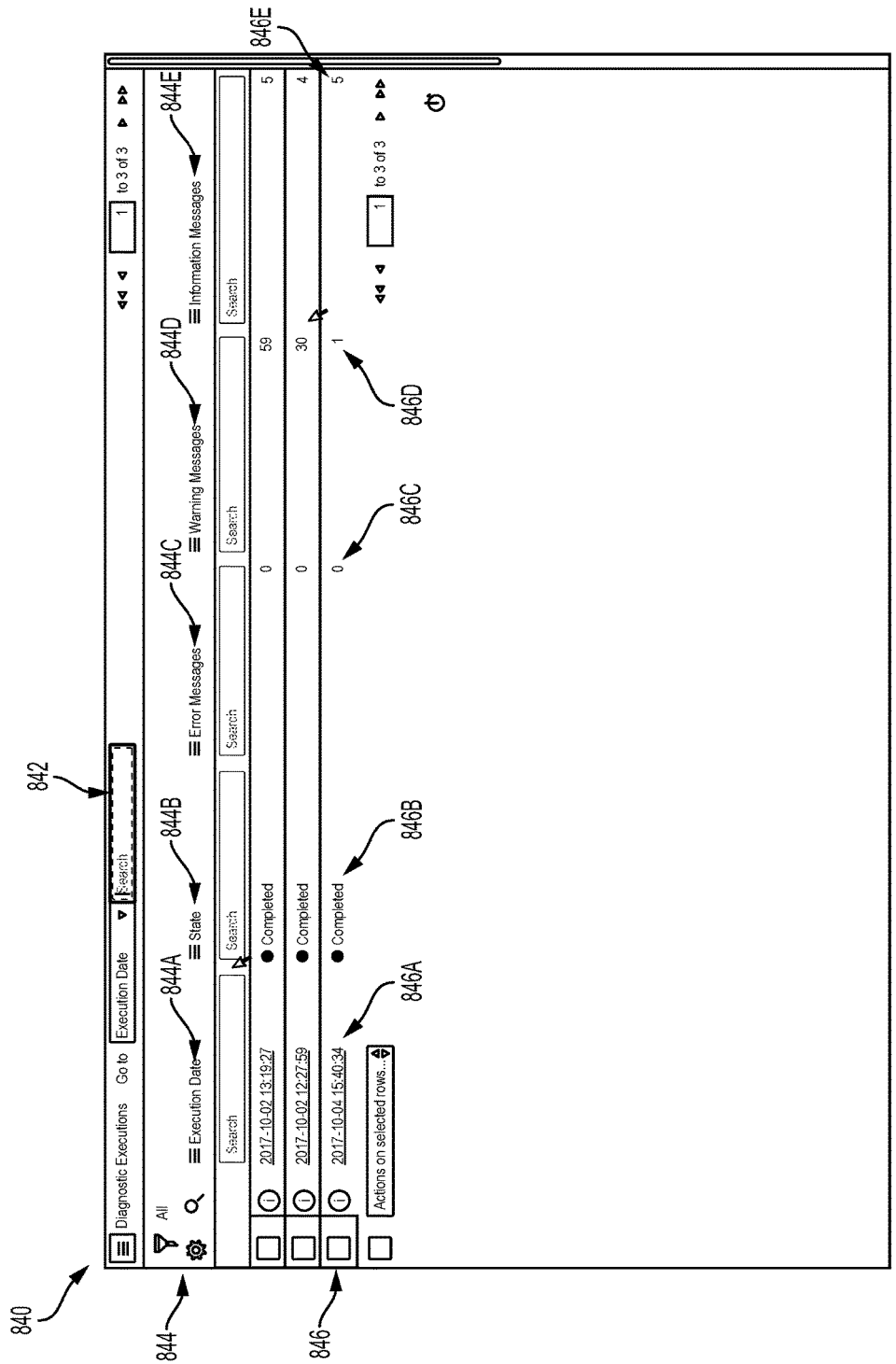
FIG. 8D depicts a performance analytics diagnostic graphical user interface, in accordance with example embodiments.

FIG. 8D depicts GUI 840 including a tabular menu that displays a list of diagnostic test suites that are executing or have been executed. GUI 840 includes text box 842, header row 844, and example diagnostic test suite results 846. Each diagnostic test suite may include execution of more than one diagnostic test. For instance, when multiple diagnostic tests are selected by way of GUI 800, the results of all selected diagnostic tests may be displayed as one row in GUI 840.

Entry of data into text box 842 may cause the list of diagnostic test suites displayed on GUI 840 to be filtered by this data. For instance, if the date "2017-10-02" is entered into text box 842, only diagnostic tests executed on this date may be displayed. Alternatively, the drop down menu to the left of text box 842 may be used to select other header columns in which the search takes place.

Header bar 844 provides column titles for the diagnostic test suites displayed in GUI 840, including an execution date header 844A, state header 844B, error messages header 844C, warning messages header 844D, and information messages header 844E.

Execution date header 844A is disposed above a column containing the dates and times of when execution began for the listed diagnostic test suites. Alternatively, this column may contain the dates and times of when execution completed for these diagnostic test suites.

State header 844B is disposed above a column containing state descriptions of the diagnostic test suites. These descriptions may indicate, for example, that a diagnostic test suite is executing or has completed execution.

Error messages header 844C is disposed above a column containing a number of error conditions found while executing each of the diagnostic test suites. This count may relate to the number of individual diagnostic tests in the suite that reported an error.

Warning messages header 844D is disposed above a column containing a number of warning conditions found while executing each of the diagnostic test suites. This count may relate to the number of individual diagnostic tests in the suite that reported a warning.

Information messages header 844E is disposed above a column containing a number of informational conditions found while executing each of the diagnostic test suites. This count may relate to the number of individual diagnostic tests in the suite that reported an informational condition.

The diagnostic test suite results in FIG. 8D may be sortable by each of these column headers. For instance, in GUI 840, the diagnostic test suites are sorted in descending order of the number of warning messages.

Example diagnostic test suite result 846 is one of possibly many such diagnostic test suite results, each individually selectable for further display. As shown in FIG. 8D, example diagnostic test suite result 846 includes execution date 846A (indicating that the diagnostic test suite began execution at 3:40:34 PM on Oct. 4, 2017), state 846B (indicating that the diagnostic test suite has completed execution), error messages 846C (indicating no errors), warning messages 846D (indicating 1 warning), and information messages 846E (indicating 5 informational messages).

If a user clicks on or otherwise activates any of execution date 846A, state 846B, error messages 846C, warning messages 846D, or information messages 846E, a GUI displaying detailed information about example diagnostic test suite result 846 may be displayed.

Figure 8E:
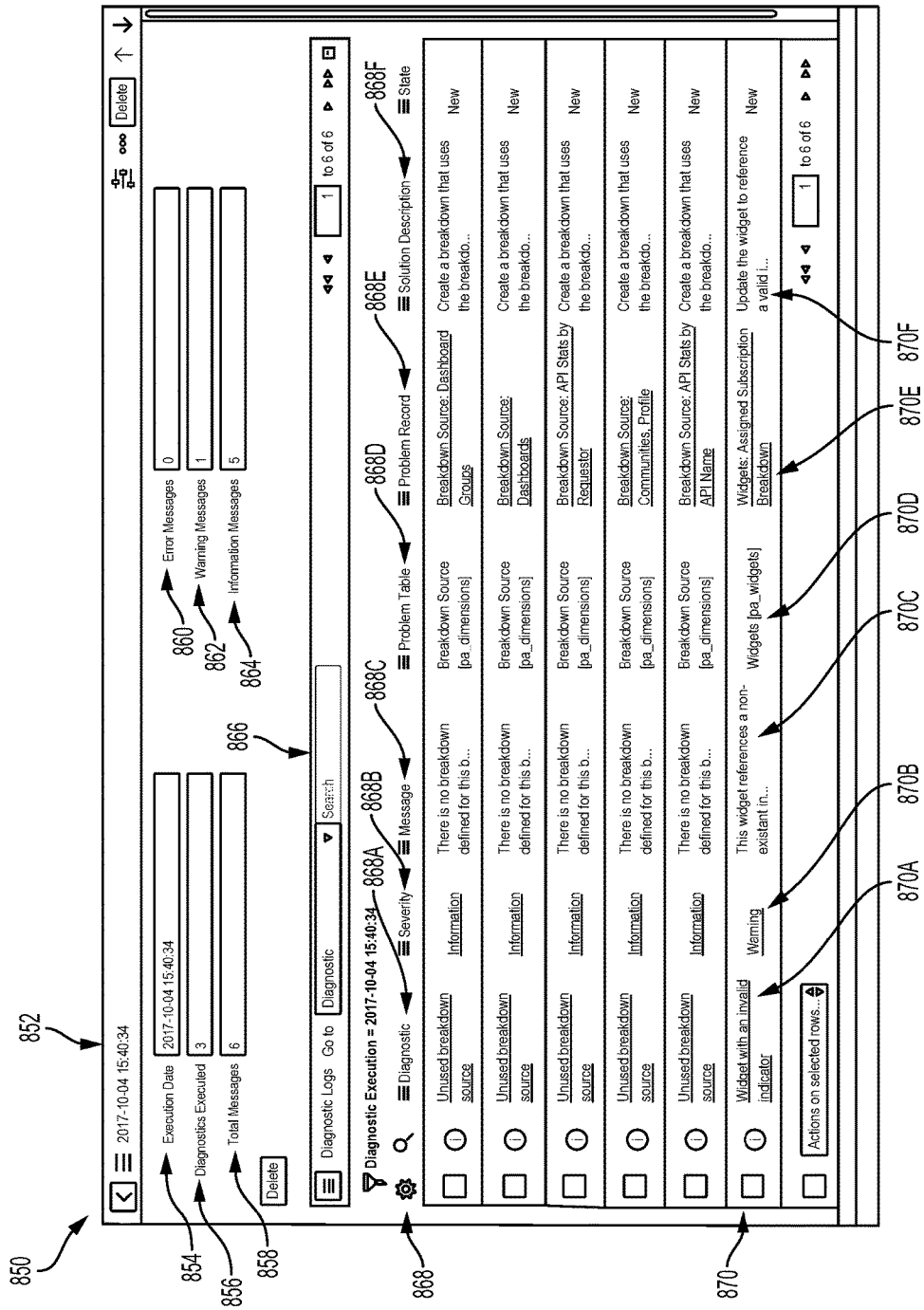
FIG. 8E depicts a performance analytics diagnostic graphical user interface, in accordance with example embodiments.

To that point, FIG. 8E depicts GUI 850 including a tabular menu that displays details of diagnostic test suite results. The results shown in GUI 850 are, for example, the details of diagnostic test suite result 846. As shown in various components of GUI 850, the information displayed therein matches that of example diagnostic test suite result 846.

For instance, name indicator 852, execution date indicator 854, total messages indicator 858, error messages indicator 860, warning messages indicator 862, and information messages indicator 864 all match those of example diagnostic test suite result 846. Diagnostics executed indicator 856 specifies that three individual diagnostic tests were performed as part of this suite.

Entry of data into text box 866 may cause the list of diagnostic tests displayed on GUI 850 to be filtered by this data. For instance, if the text "widget" is entered into text box 866, only diagnostic tests with a description containing the term "widget" may be displayed. Alternatively, the drop down menu to the left of text box 866 may be used to select other header columns in which the search takes place.

Header bar 868 provides column titles for the diagnostic tests displayed in GUI 850, including a diagnostic name header 868A, severity header 868B, message header 868C, problem table header 868D, problem record header 868E, and solution description header 868F.

Diagnostic name header 868A is disposed above a column containing a brief description of the problems detected by each diagnostic test, if a problem was detected. Severity header 868B is disposed above a column containing the severity of the detected problems, each in accordance with the severity column of Table 1 (e.g., error, warning, or information). Message header 868C is disposed above a column containing a longer description of the detected problems, each in accordance with the description column of Table 1. Problem table header 868D is disposed above a column containing a reference to the database table in which each problem was encountered (if applicable). Problem record header 868E is disposed above a column containing a reference to the database record in which each problem was encountered (if applicable). Solution description header 868F is disposed above a column containing a recommended solution for each of the detected problems, in accordance with the solution column of Table 1.

Example diagnostic test result 870 is one of possibly many such diagnostic test results. As shown in FIG. 8E, example diagnostic test result 870 includes diagnostic indicator 870A, severity indicator 870B, message indicator 870C, problem table indicator 870D, problem record indicator 870E, and solution description indicator 870F. Example diagnostic test result 870 relates to the diagnostic test with the description "A widget references a non-existent KPI" in Table 1.

VII. EXAMPLE OPERATIONS

Figure 9:
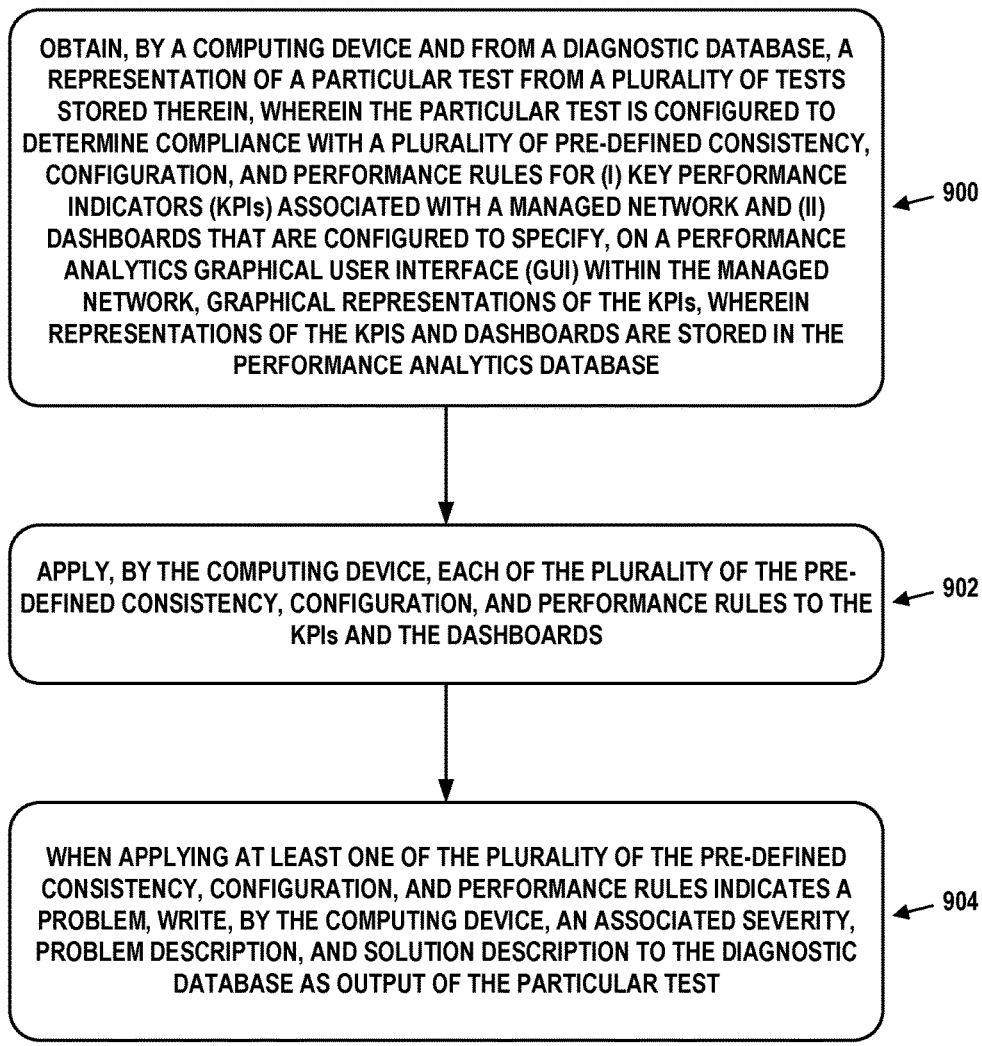
FIG. 9 is a flow chart, in accordance with example embodiments.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

These embodiments may involve diagnostic testing of a performance analytics software application. A performance analytics database, a diagnostic database, and a computing device may be disposed within a computational instance of a remote network management platform that remotely manages a managed network.

Block 900 may involve obtaining, by the computing device and from the diagnostic database, a representation of a particular test from a plurality of tests stored therein, where the particular test is configured to determine compliance with a plurality of pre-defined consistency, configuration, and performance rules for (i) KPIs associated with the managed network and (ii) dashboards that are configured to specify, on a performance analytics GUI within the managed network, graphical representations of the KPIs, where representations of the KPIs and dashboards are stored in the performance analytics database. The particular test may be, for example, any one of the diagnostic tests listed in Table 1, variations thereof, or another diagnostic test entirely.

Block 902 may involve applying, by the computing device, each of the plurality of the pre-defined consistency, configuration, and performance rules to the KPIs and the dashboards.

Block 904 may involve, when applying at least one of the plurality of the pre-defined consistency, configuration, and performance rules indicates a problem, writing, by the computing device, an associated severity, problem description, and solution to the diagnostic database as output of the particular test.

In some embodiments, the associated severity, problem description, and solution are defined in the diagnostic database as part of the representation of the particular test.

In some embodiments, a particular rule of the plurality of the pre-defined consistency, configuration, and performance rules specifies that a database table is required to be present in the performance analytics database in order for at least one of the dashboards to be displayable.

In some embodiments, a particular rule of the plurality of the pre-defined consistency, configuration, and performance rules specifies that a field within a database table is required to be present in the performance analytics database in order for at least one of the dashboards to be displayable.

In some embodiments, a particular rule of the plurality of the pre-defined consistency, configuration, and performance rules specifies that a field within a database table of the performance analytics database is required to contain a particular value in order for at least one of the dashboards to be displayable. In alternative or additional embodiments, the performance analytics database may be required to contain a particular value within a particular range of values in order for at least one of the dashboards to be displayable.

In some embodiments, a particular rule of the plurality of the pre-defined consistency, configuration, and performance rules determines whether collection, by the performance analytics software application, of one or more values of a KPI has failed.

In some embodiments, a particular rule of the plurality of the pre-defined consistency, configuration, and performance rules determines whether collection, by the performance analytics software application, of one or more values of a KPI is still executing.

In some embodiments, a particular rule of the plurality of the pre-defined consistency, configuration, and performance rules determines whether one of the dashboards references a KPI that is undefined.

In some embodiments, a client device disposed within the managed network invokes the diagnostic software program and displays a diagnostics GUI. The diagnostic software program may be further configured to: prior to obtaining the representation of the particular test, cause the diagnostics GUI on the client device to display, in tabular form, a selectable list of the plurality of tests; and receive, from the client device, selection of the particular test.

In some of these embodiments, the diagnostic software program may be further configured to: in response to receiving selection of the particular test, cause the diagnostics GUI on the client device to display a definition of the particular test that includes an editable representation of executable script code that carries out at least part of the particular test.

In some of these embodiments, the diagnostic software program is further configured to: in response to receiving selection of the particular test, cause the diagnostics GUI on the client device to display a definition of the particular test that includes a configurable representation of the particular test, where the configurable representation allows menu-based specification of rules that check properties of particular database tables of the performance analytics database.

In some of these embodiments, the diagnostic software program is further configured to: when applying at least one of the plurality of the pre-defined consistency, configuration, and performance rules indicates a problem, cause the diagnostics GUI on the client device to display, in tabular form, the associated severity, problem description, and solution description.

Although the embodiments herein have been described in the context of a performance analytics application that collects data, defines dashboards, and transmits the data and dashboards to a client device for display, these embodiments may also apply to other applications. For example, any application that defines associations or relationships between data and graphical user interfaces on which this data is presented can benefit from the diagnostic tools described herein. Additionally, these embodiments can also operate on any database table to determine compliance between the records therein and the applications that make use of these records.

VIII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system for diagnostic testing of a performance analytics software application, wherein the system is disposed within a computational instance of a remote network management platform that remotely manages a managed network, the system comprising:
   a performance analytics database containing performance analytics data that define key performance indicators (KPIs) associated with the managed network and that define dashboards that are configured to specify, on a performance analytics graphical user interface (GUI) within the managed network, graphical representations of the KPIs;
   a diagnostic database containing representations of a plurality of tests, the tests configured to determine whether the KPIs and the dashboards comply with pre-defined consistency, configuration, and performance rules; and
   a computing device operational to execute a diagnostic software program, wherein the diagnostic software program is configured to:
      obtain, from the diagnostic database, a representation of a particular test of the plurality of tests, wherein the particular test includes a plurality of the pre-defined consistency, configuration, and performance rules,
      apply each of the plurality of the pre-defined consistency, configuration, and performance rules to the KPIs and the dashboards stored in the performance analytics database, and
      write, when applying at least one of the plurality of the pre-defined consistency, configuration, and performance rules indicates a problem, an associated severity, problem description, and solution description to the diagnostic database as output of the particular test.

2. The system of claim 1, wherein the associated severity, problem description, and solution description are defined in the diagnostic database as part of the representation of the particular test.

3. The system of claim 1, wherein a particular rule of the plurality of the pre-defined consistency, configuration, and performance rules specifies that a database table is required to be present in the performance analytics database in order for at least one of the dashboards to be displayable.

4. The system of claim 1, wherein a particular rule of the plurality of the pre-defined consistency, configuration, and performance rules specifies that a field within a database table is required to be present in the performance analytics database in order for at least one of the dashboards to be displayable.

5. The system of claim 1, wherein a particular rule of the plurality of the pre-defined consistency, configuration, and performance rules specifies that a field within a database table of the performance analytics database is required to contain a particular value in order for at least one of the dashboards to be displayable.

6. The system of claim 1, wherein a particular rule of the plurality of the pre-defined consistency, configuration, and performance rules determines whether collection, by the performance analytics software application, of one or more values of a KPI has failed.

7. The system of claim 1, wherein a particular rule of the plurality of the pre-defined consistency, configuration, and performance rules determines whether collection, by the performance analytics software application, of one or more values of a KPI is still executing.

8. The system of claim 1, wherein a particular rule of the plurality of the pre-defined consistency, configuration, and performance rules determines whether one of the dashboards references a KPI that is undefined.

9. The system of claim 1, wherein a client device disposed within the managed network invokes the diagnostic software program and displays a diagnostics GUI, and wherein the diagnostic software program is further configured to:
   prior to obtaining the representation of the particular test, cause the diagnostics GUI on the client device to display, in tabular form, a selectable list of the plurality of tests; and
   receive, from the client device, selection of the particular test.

10. The system of claim 9, wherein the diagnostic software program is further configured to:
   in response to receiving selection of the particular test, cause the diagnostics GUI on the client device to display a definition of the particular test that includes an editable representation of executable script code that carries out at least part of the particular test.

11. The system of claim 9, wherein the diagnostic software program is further configured to:
   in response to receiving selection of the particular test, cause the diagnostics GUI on the client device to display a definition of the particular test that includes a configurable representation of the particular test, wherein the configurable representation allows menu-based specification of rules that check properties of particular database tables of the performance analytics database.

12. The system of claim 9, wherein the diagnostic software program is further configured to:
   when applying at least one of the plurality of the pre-defined consistency, configuration, and performance rules indicates a problem, cause the diagnostics GUI on the client device to display, in tabular form, the associated severity, problem description, and solution description.

13. A method for diagnostic testing of a performance analytics software application, wherein a performance analytics database, a diagnostic database, and a computing device are disposed within a computational instance of a remote network management platform that remotely manages a managed network, the method comprising:

obtaining, by the computing device and from the diagnostic database, a representation of a particular test from a plurality of tests stored therein, wherein the particular test is configured to determine compliance with a plurality of pre-defined consistency, configuration, and performance rules for (i) key performance indicators (KPIs) associated with the managed network and (ii) dashboards that are configured to specify, on a performance analytics graphical user interface (GUI) within the managed network, graphical representations of the KPIs, wherein representations of the KPIs and dashboards are stored in the performance analytics database;

applying, by the computing device, each of the plurality of the pre-defined consistency, configuration, and performance rules to the KPIs and the dashboards; and when applying at least one of the plurality of the pre-defined consistency, configuration, and performance rules indicates a problem, writing, by the computing device, an associated severity, problem description, and solution description to the diagnostic database as output of the particular test.

14. The method of claim 13, wherein a particular rule of the plurality of the pre-defined consistency, configuration, and performance rules specifies that a database table is required to be present in the performance analytics database in order for at least one of the dashboards to be displayable.

15. The method of claim 13, wherein a particular rule of the plurality of the pre-defined consistency, configuration, and performance rules specifies that a field within a database table is required to be present in the performance analytics database in order for at least one of the dashboards to be displayable.

16. The method of claim 13, wherein a particular rule of the plurality of the pre-defined consistency, configuration, and performance rules specifies that a field within a database table of the performance analytics database is required to contain a particular value in order for at least one of the dashboards to be displayable.

17. The method of claim 13, wherein a particular rule of the plurality of the pre-defined consistency, configuration, and performance rules determines whether collection, by the performance analytics software application, of one or more values of a KPI has failed.

18. The method of claim 13, wherein a particular rule of the plurality of the pre-defined consistency, configuration, and performance rules determines whether collection, by the performance analytics software application, of one or more values of a KPI is still executing.

19. The method of claim 13, wherein a client device disposed within the managed network invokes the particular test and displays a diagnostics GUI, the method further comprising:

prior to obtaining the representation of the particular test, causing the diagnostics GUI on the client device to display, in tabular form, a selectable list of the plurality of tests; and receiving, from the client device, selection of the particular test.

20. An article of manufacture including a non-transitory computer-readable medium having stored thereon program instructions for diagnostic testing of a performance analytics software application, wherein a performance analytics database, a diagnostic database, and a computing device are disposed within a computational instance of a remote network management platform that remotely manages a managed network, wherein the program instructions, upon execution by the computing device, cause the computing device to perform operations comprising:

obtaining, from the diagnostic database, a representation of a particular test from a plurality of tests stored therein, wherein the particular test is configured to determine compliance with a plurality of pre-defined consistency, configuration, and performance rules for (i) key performance indicators (KPIs) associated with the managed network and (ii) dashboards that are configured to specify, on a performance analytics graphical user interface (GUI) within the managed network, graphical representations of the KPIs, wherein representations of the KPIs and dashboards are stored in the performance analytics database;

applying each of the plurality of the pre-defined consistency, configuration, and performance rules to the KPIs and the dashboards; and writing, when applying at least one of the plurality of the pre-defined consistency, configuration, and performance rules indicates a problem, an associated severity, problem description, and solution description to the diagnostic database as output of the particular test.

* * * * *